United States Patent Office 2,860,112
Patented Nov. 11, 1958

2,860,112

ALKYD RESINS PRODUCED FROM TRICARBOXYLIC ACIDS AND DIBASIC ALCOHOLS

Robert F. Leary, Cranford, Lewis W. Bowman, Westfield, and Roger S. Hawley, Cranford, N. J., assignors to Esso Research and Engineering Company, a corporation of Delaware No Drawing. Application October 31, 1955
Serial No. 544,041

18 Claims. (Cl. 260—22)

This invention relates to improved polyesters and alkyd type resins which comprise reaction products of polyfunctional adducts of bicycloalkene dicarboxylic acids and dienophilic carboxylic compounds, preferably $C_3$ to $C_8$ unsaturated aliphatic dicarboxylic acids or anhydrides, such as, fumaric acid, citraconic acid or anhydride, mesaconic acid, itaconic acid or anhydride, acticonic acid or anhydride, maleic acid or, preferably maleic anhydride in combination with an unsaturated monobasic acid and certain glycols.

The invention relates more particularly to improved polyesters and alkyd type resins which have been derived from the reaction between an adduct of a dicyclodiene dicarboxylic acid such as a $C_{12}$ to $C_{18}$, preferably a $C_{12}$ to $C_{14}$ dicycloalkadiene dicarboxylic acid and maleic anhydride with glycols having two adjacent hydroxyl groups and/or with glycol ethers.

In a more specific aspect, the present invention contemplates a resinous polyester formed by the reaction of a tricarboxylic acid or anhydride with certain glycols and a minor proportion of an unsaturated aliphatic monobasic acid wherein the tricarboxylic adduct formed has been produced by reacting a dicyclopentadiene dicarboxylic acid with maleic acid and/or preferably maleic anhydride at temperatures between about 50° to 350° C., advantageously 100° to 300° C., preferably about 150° to 350° C. The above adduct, together with a minor proportion of a modifier, such as an unsaturated monobasic acid, is then esterified with a glycol of about 3 to 16 carbon atoms which is advantageously a glycol of about 3 to 8 carbon atoms containing two adjacent hydroxyl groups, or an ether-type glycol having at least 4 carbon atoms (preferably 4–12 carbon atoms). Esterification temperatures also vary between about 50° to 350° C., advantageously about 100° to 300° C., preferably about 150° to 250° C., e. g. 180° to 240° C.

The modifier in the esterification reaction advantageously comprises about 15 to 60 equivalent percent, preferably 25 to 50 equivalent percent based on the total equivalents of acid of an unsaturated aliphatic monobasic acid having about 10 to 20, preferably about 12 to 18 carbon atoms. Preferred monobasic acids are vegetable oil fatty acids, such as dehydrated castor fatty acid, oleic acid, ricinoleic acid, linoleic acid, linolenic acid, or especially linseed fatty acids and soybean fatty acids, etc. Reaction times vary from 1 to 40 hours or more, preferably about 15 to 20 hours.

On an equivalent basis, the amount of tricarboxylic acid or anhydride, plus the monobasic acid should not exceed and should preferably approximately equal the amount (also in equivalents) of glycol in the resin to form a substantially completely esterified material.

In accordance with the present invention, the above reaction products which are alkyd-type resins of a tricarboxylic acid or anhydride of cyclopentadiene with a dihydric alcohol and a monobasic acid may be compounded with about 0.2 to 10.0, preferably about 0.3 to 3.0 parts by weight of added solvent, such as aliphatic or, preferably aromatic solvents, such as benzene, xylenes, toluene, or straight run mineral spirits, to produce a varnish. To the varnish is, preferably added about 0.001 to 0.5 part by weight of a drier such as metal carboxylate soaps including zinc, iron or calcium, naphthenates or octoates, or especially cobalt, lead or manganese naphthenates.

Dicyclodiene dicarboxylic acids which are derived primarily from $C_{12}$ to $C_{16}$ dicycloalkadienes, such as alkyl-substituted cyclopentadienes or especially cyclopentadiene per se, may be prepared in high yields by the reaction of the particular cyclodiene, such as cyclopentadiene with metallic sodium followed by carboxylation with $CO_2$. In this two-step reaction, the sodium is preferably dispersed to an average particle size of less than about 50 microns in diameter and reacted with cyclopentadiene or alkyl cyclopentadienes in the presence of a small amount of an anhydrous alcohol activator, such as ethyl or isopropyl alcohol, followed by conversion of the sodium cyclopentadienes formed to corresponding acid salts by treatment with $CO_2$, preferably at superatmospheric pressures up to 1000 p. s. i. g.

When 1 to 2 grams of anhydrous alcohol activator, per mole of dispersed sodium, is employed, the disodium salt of the dicyclopentadiene dicarboxylic acid is produced with minimum production of sodium carbonate or bicarbonate.

The free dicyclopentadiene dicarboxylic acid is then prepared by hydrolyzing the sodium salt with an aqueous solution of a mineral acid, such as HCl, $H_2SO_4$, $HNO_3$, etc. Sulfuric acid or hydrochloric acid is preferred. The sodium salt is conveniently converted to the free acid by dissolving the salt in water, boiling for a few minutes and precipitating the acid by addition of dilute HCl and recovering the acid crystals by filtration. The crude product is recrystallized from approximately 50% aqueous methanol or approximately 70% aqueous acetic acid. A perfectly white crystalline acid is obtained having a melting point of 210° C. and a neutralization equivalent equal to 509 mgm. KOH/gm. It possesses the following structural formula.

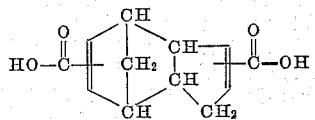

The reactions above described are believed to be according to the following series of equations:

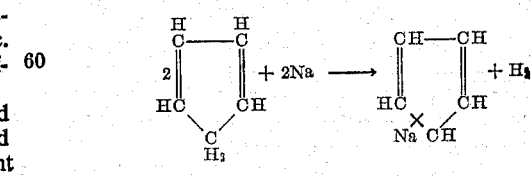

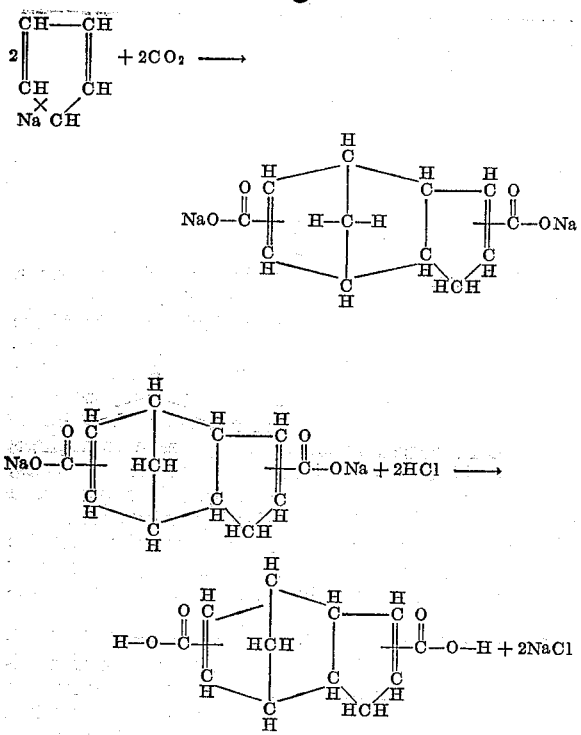

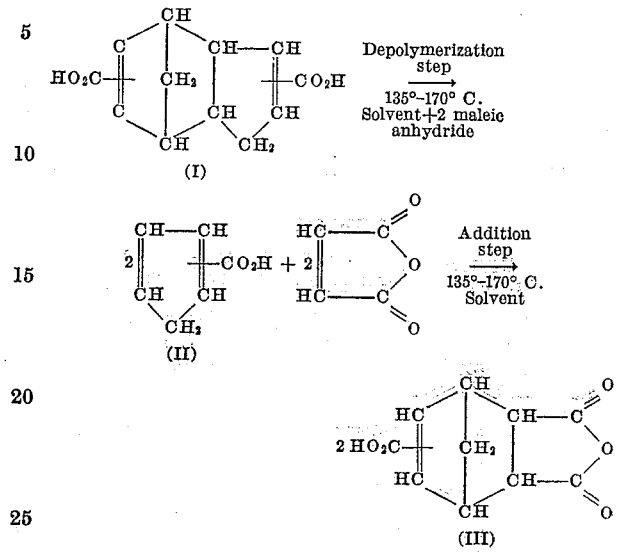

The above ultimate compound produced in the last equation is dicyclopentadiene dicarboxylic acid and is subsequently reacted with suitable dienophilic acid compounds such as maleic anhydride to form a tricarboxylic adduct as more fully described hereinafter. The basic principle of the reaction is that a small amount of the dimer acid is decomposed to monomer when heated, although the equilibrium of the mixture heavily favors the dibasic acid dimer. The monomer acid present will form stable tribasic acid derivatives by combining with added dienophilic compounds such as maleic anhydride, displacing the equilibrium until virtually all of the original dimer acid is reacted.

Other dicarboxylated dicyclodiene compounds suitable for the purposes of the present invention, but less preferable, are monomethyl or dimethyl dicyclopentadiene dicarboxylic acid, i. e., the dicarboxylated dimer of methylcyclopentadiene, or methyl dicyclopentadiene dicarboxylic acid, i. e., the mixed dimer of cyclopentadiene carboxylic acid and methyl cyclopentadiene carboxylic acid.

The other essential reagent used in the present invention is a dienophilic unsaturated carboxylic compound, such as maleic acid and preferably maleic anhydride.

The desired reaction to form the tricarboxylic adduct is carried out satisfactorily by heating the reaction mixture at temperatures sufficiently high to bring about cracking or depolymerization of the dicyclodiene dicarboxylic acid into its monomer. These reaction temperatures, as beforementioned, are in the range of about 50° to 350° C., advantageously about 100° to 300° C., the preferred reaction temperatures being between about 125° or 150° C. and 200° or 250° C. The pressure depends to a certain extent on the particular cyclodiene dicarboxylic acid employed, the dienophilic anhydride or acid used and the temperature at which the reaction is carried out. However, the reaction may be normally conducted at pressures ranging from atmospheric or slightly subatmospheric to moderately elevated pressures, such as 10 or 50 p. s. i. g., the reaction being a rapid one which can normally be completed in 5 to 60 minutes. The reaction can be carried out either batchwise or in a continuous manner.

The reaction may be represented by the following simultaneous steps as applied to typical reactants within the scope of the invention:

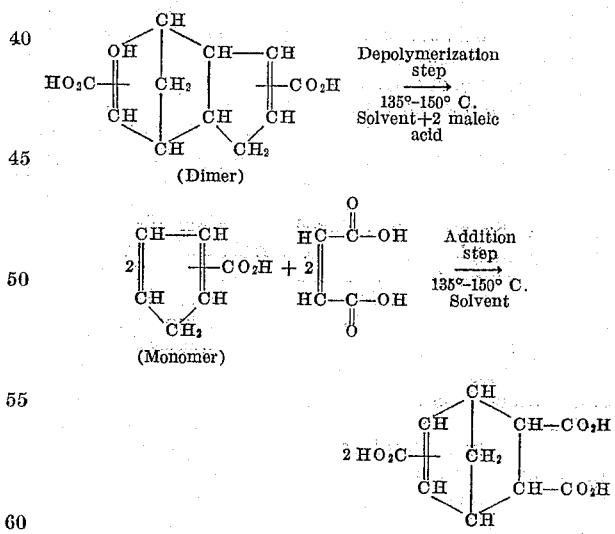

The resulting compound (III) is a derivative of bicycloheptene and is termed bicyclo (2,2,1)-5-heptene-2,3-dicarboxylic anhydride-5 or 6-carboxylic acid. It can also be designated as endo-methylene-4-cyclohexene-4 or 5-carboxy-1,2-dicarboxylic acid anhydride. This anhydride is capable of existing in either the "endo" or "exo" form, the higher the reaction temperature between the cyclodiene dicarboxylic acid and maleic anhydride, the greater the amount of endo isomer.

Typical reactions employing maleic acid are as follows:

The reaction temperature is suitably controlled by refluxing a solvent, such as xylene, mineral spirits, nonane, propionic acid, acetic acid, or similar liquids, particularly, hydrocarbons or saturated aliphatic acids, which are substantially inert in the reaction mixture and boil in the desired reaction temperature range when under suitable pressure. Usually about 2 to 10 parts of such a liquid are used per part of cyclodiene carboxylic acid. However, the reaction can be carried out without solvents, using other temperature control means. Nevertheless, the use of the solvent is preferred since it has other beneficial effects, such as giving better contact between the reagents.

Similarly, a tetracarboxylic acid product may be prepared from the dimer acid and aconitic acid, with the following formula:

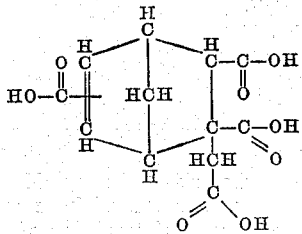

The alkyd type resinous compositions of the present invention may be made in any desirable manner. The compositions may be produced by reacting a preformed adduct of a dicyclodiene dicarboxylic acid and dienophilic dicarboxylic compound with an admixture of the glycol and unsaturated aliphatic monobasic acid. The resinous composition may also be produced by substantially simultaneously reacting the dicyclodiene dicarboxylic acid, dienophilic dicarboxylic compound, glycol, and unsaturated aliphatic monobasic acid; which procedure obviates the necessity of forming an intermediate adduct. Alternatively, the resinous composition may be produced by partially esterifying a preformed adduct of the dicyclodiene dicarboxylic acid and dienophilic dicarboxylic compound with the glycol followed by substantially complete esterification with the unsaturated aliphatic monobasic acid. Esterification temperatures, as beforementioned, are advantageously between about 100° to 300° C.

In order to more fully illustrate the present invention, the following examples are given:

EXAMPLE I

A dicyclopentadiene dicarboxylic acid-maleic anhydride adduct was produced by heating and stirring a suspension of 0.5 mole (110 grams) of dicyclopentadiene dicarboxylic acid and 1.0 mole (98 grams) of maleic anhydride in 400 cc. of anhydrous xylene. The charge was heated and maintained at reflux until the cloudy suspension changed into two distinct phases (if stirring is stopped); a clear upper liquid phase and an opaque brown lower phase. The mixture was heated with vigorous stirring for an additional 15 minutes. The layers were then separated and the lower viscous phase was dried under 10 millimeters of mercury absolute at a temperature below 100° C. (i. e. 50° C.).

An alkyd type resin was then prepared by heating 1.10 equivalents (49.6 grams) of 2,3-butanediol with 0.75 equivalent (52.1 grams) of the above dicyclopentadiene dicarboxylic acid-maleic anhydride adduct and 0.25 equivalent (70.1 grams) of linseed fatty acid in the presence of a mixture of 30 cc. of benzene and 15 cc. of xylene. The esterification reaction was performed in a 300 milliliter 4-neck flask fitted with a thermometer, a nitrogn inlet, and paddle type stirrer, and a water trap fitted with a reflux condenser. Reaction was performed by slowly bubbling in nitrogen and continuously refluxing (cooking) the solution to remove water formed during esterification into the trap. The mixture of benzene and xylene was employed as an entrainer for removing water, the amount of said mixture being 20 volume percent per volume of total reactants; said amount not being especially critical. Furthermore, any substantially inert hydrocarbon material such as paraffins, naphthenes, and/or aromatics which will form an azeotrope with water, may also be employed.

During the first 10 hours of cooking, the reflux temperature was held at 108° to 150° C., 16.1 milliliters of the water layer being collected. The water layer contained 4.3 grams of water and 11.8 grams of 2,3-butanediol. Another 13.9 grams of 2,3-butanediol were then added and the cooking continued at 142° to 152° C. for an additional 7 hours in which period there was collected 6.8 cc. more of the water layer containing 1.5 grams of water and 5.3 grams of 2,3 butanediol. Another 6.0 grams of 2,3-butanediol were then added and the cooking continued at 142° to 202° C. for 7.5 hours, collecting 11.4 cc. of the water layer containing 1.4 grams of water and 10.0 grams of 2,3-butanediol.

A 50 weight percent solution of the resin thus produced, was then dissolved in a commercially available solvent (solvent-"A"). The solvent was derived from a naphthenic base crude and had the following properties:

| Characteristic: | Value |
|---|---|
| Flash point (° F.) | 105 |
| Aromatics (wt. percent) | 95 |
| I. B. point (° F.) | 300 |
| F. B. point (° F.) | 370 |

The resin dissolved as above had a Gardner viscosity of less than "A" (0.50 poise).

The resin was then cooked for an additional 10 hours at 203° to 212° C., 2.0 cc. of a water layer being collected in the water trap. A sample of 58.5 grams of the resin was then taken for evaluation and a 50 wt. percent solution of said resin in solvent "A" had a Gardner viscosity of "C" (0.85 poise) and an acid No. of 4.41 mg. KOH/gm.

The main portion of the resin was then cooked for an additional two hours with the temperature being raised to 199° C. in 1.25 hours and then held at 199° to 205° C. for 30 minutes. A sample (35 grams) was taken for evaluation and a 50 weight percent solution of the resin in solvent "A" had a Gardner viscosity of "E" (1.25 poises) and an acid No. of 4.16 mg. KOH/gm.

The remaining portion of the resin was then cooked for 1.5 hours longer with the temperature at 201°–206° C. for 30 minutes. A 50 weight percent solution of the resin thus produced and dissolved in solvent "A" had a Gardner viscosity of "G" (1.65 poises) and an acid No. of 4.05 mg. KOH/gm.

Another resin using 1,3-butanediol in place of the 2,3-butanediol was prepared as described above. Film evaluations of the above-mentioned resin solutions are shown below.

Table I

Film evaluations of the alkyd resin at the three Gardner viscosities of C, E and G showed that good baked films were obtained from all three on baking (1) without a drier and (2) with a manganese naphthenate drier as shown below:

| Gardner Visc. | Drier | Baked @ 300° F., minutes | Thickness (mils) | Hardness (Sward) | Flex,[2] inches | Chemical Resistance [3] | | | |
|---|---|---|---|---|---|---|---|---|---|
| | | | | | | Water | Grease | Soap | Caustic |
| C | None | 60 | 1.8 | 10 | ⅛ | 0 | 0 | 0 | 0 |
| C | 0.01Mn | 30 | 1.4 | 20 | ⅛ | 0 | 0 | 1 | 3 |
| E | None | 60 | 1.05 | 22 | ⅛ | 0 | 0 | 0 | 2 |
| G | None | 60 | 1.2 | 16 | ⅛ | 0 | 0 | 0 | 1 |
| G | 0.01Mn | 30 | 1.1 | 30 | ⅛ | 0 | 0 | 0 | 2 |
| D-E [1] | None | 60 | 0.6 | 4 | ⅛ | 0 | 0 | 1 | 9 |
| E-E [1] | 0.01Mn | 30 | 1.2 | 4 | ⅛ | 0 | 0 | 3 | 3 |

[1] Alkyd resin prepared using 1,3-butanediol in place of 2,3-butanediol.
[2] ⅛ is the diameter in inches of a steel rod over which the panel containing the film can be snap bent without failure.
[3] Water for 5 hours; grease for 2 hours; soap for 2 hours and caustic, 1% NaOH for 1 hr. Code=0—unaffected to 9—complete failure.

The results obtained with the resin solutions of the invention are excellent as compared to conventional glyptal resins (i. e. polymer products of glycerine+phthalic anhydride). They further show that the dihydric alcohol must contain two adjacent hydroxyl groups for satisfactory hardness and chemical resistance. This is shown by comparing the films produced according to the invention with the last two films in Table I which are poorer as to hardness and resistance to soap and caustic when the two hydroxyl groups in the dihydric alcohol (1,3 butanediol) are not adjacent. Similarly, a varnish prepared with 1,4 butanediol failed to dry when baked at 300° F. for 60 minutes with no drier present and gave soft films of very poor quality when baked with driers.

EXAMPLE II

An alkyd-type resin was prepared according to the same general procedure as in Example I except that propylene glycol was substituted for the 2,3-butanediol. The heating (cooking) time was 15 hours at a maximum temperature of 220° C. at which time the esterification was essentially complete.

The resin obtained was dissolved to form a 50% solution in "Varsol" (straight run mineral spirits) to produce a varnish and was found to have a Gardner color of 6.5 and a Gardner viscosity of $Z_{2.5}$.

Film evaluations of portions of the above-mentioned resin solutions (varnishes) are shown below:

*Table II*

| Drier [1] | Thickness, mils | Sward | Resistance | | | | Flex, inches |
|---|---|---|---|---|---|---|---|
| | | | Water | Soap | Grease | Caustic | |
| Pb 0.4 Mn 0.04 | 0.75 | 30 | 0 | 0 | 0 | 1 | ⅛ |
| Co 0.02 | 0.85 | 14 | 0 | 0 | 0 | 1 | ⅛ |

[1] Pb and Co as naphthenates.

The above results are excellent as compared to conventional glyptal resins. For producing a varnish, the composition advantageously contains per 100 parts by weight of the total composition about 25–75 parts by weight (preferably 40–60 parts by weight) each of resin and solvent with about 0 to 0.5 wt. percent of a drier. The solvent advantageously comprises substantially saturated hydrocarbons such as a paraffinic, naphthenic or aromatic hydrocarbon which will form an azeotrope with water, e. g. heptane, hexane, cyclohexane, benzene, xylenes, etc.

EXAMPLE III

An alkyd-type resin was prepared according to the same general procedure as in Example I, using 58.4 g. (1.10 equivalent) of di-ethylene glycol, 34.7 grams (0.50 equivalent) of dicyclopentadiene dicarboxylic acid-maleic anhydride adduct, 140.2 grams (0.50 equivalent) of linseed fatty acid, and 30 milliliters of benzene to azeotrope the water formed into the water trap during the esterification reaction.

When preparing an alkyd-type resin using ethylene glycol and cyclopentadiene carboxylic acid-maleic anhydride adduct with 40% linseed fatty acids as modifier and with benzene as an entrainer for removing water, gelation invariably occurred long before esterification was complete. On the contrary, the resin was obtained without gelation when using diethylene glycol or triethylene glycol in place of the ethylene glycol.

Dihydroxy ether dihydric alcohols such as diethylene and triethylene glycol have another advantage in that they do not as readily azeotrope or distill over with the entrainer and water as do ethylene glycol, propylene glycol, 1,5 pentanediol, 2,5 hexanediol and other glycols.

While there are above described a number of specific embodiments of the present invention, it is obviously possible to produce other embodiments and various equivalent modifications and variations thereof without departing from the spirit of the invention or the scope of the appended claims.

What is claimed is:

1. A resinous composition which comprises the esterification product of a first reactant consisting of a mixture of an adduct of a $C_{12}$ to $C_{14}$ dicyclopentadiene dicarboxylic acid and a dienophilic dicarboxylic compound selected from the group consisting of $C_3$ to $C_8$ unsaturated aliphatic dicarboxylic acids and anhydrides with a minor proportion of an unsaturated aliphatic monocarboxylic acid and a second reactant consisting of a glycol of at least 3 carbon atoms selected from the group consisting of glycols containing two adjacent hydroxyl radicals, ethylene glycol ethers, and mixtures thereof; the amount of acid equivalents of said first reactant being no greater than the base equivalents of said second reactant.

2. Composition according to claim 1 in which the dienophilic carboxylic compound is maleic anhydride.

3. Composition according to claim 2 in which the glycol is propylene glycol.

4. Composition according to claim 2 in which the glycol is triethylene glycol.

5. Composition according to claim 2 in which the glycol is 2,3-butanediol.

6. Composition according to claim 2 in which the glycol is diethylene glycol.

7. Composition according to claim 2 in which the dicyclopentadiene dicarboxylic acid is dicyclopentadiene dicarboxylic acid.

8. Composition according to claim 2 in which the dicyclopentadiene dicarboxylic acid is monomethyl dicyclopentadiene dicarboxylic acid.

9. Composition according to claim 2 in which the dicyclopentadiene dicarboxylic acid is dimethyl dicyclopentadiene dicarboxylic acid.

10. A varnish which comprises about 25–75 parts by weight of the resinous composition of claim 1, and about 25–75 parts by weight of a resin solvent.

11. A varnish which comprises the resinous composition of claim 3, about 40–60 parts by weight of a substantially saturated hydrocarbon resin solvent and up to about 0.5 part by weight of a drier.

12. A varnish which comprises a major proportion of the resinous composition of claim 17, a minor proportion but at least 25 weight percent of a hydrocarbon resin solvent, and about 0.1 to 0.5 weight percent of a drier selected from the group consisting of cobalt, lead and manganese naphthenates and mixtures thereof.

13. Varnish according to claim 12 in which the hydrocarbon solvent comprises predominantly aromatic hydrocarbons.

14. A process for preparing a resinous composition which comprises reacting a $C_{12}$ to $C_{14}$ dicyclopentadiene dicarboxylic acid at a temperature between about 50° and 350° C. with a dienophilic dicarboxylic compound selected from the group consisting of $C_3$ to $C_8$ unsaturated aliphatic dicarboxylic acids and anhydrides, esterifying, at a temperature between about 50° to 350° C. and in the presence of a hydrocarbon diluent, the tricarboxylic adduct formed with a mixture of a minor proportion of an unsaturated aliphatic monocarboxylic acid and a glycol of at least 3 carbon atoms selected from the group consisting of glycols containing two adjacent hydroxyl radicals, ethylene glycol ethers, and mixtures thereof, and recovering the resin formed thereby, the amount of said total equivalents of acid being no greater than the equivalents of said glycol.

15. A process for preparing a resinous composition which comprises reacting at about 50° to 350° C. in the presence of an aromatic hydrocarbon diluent a mixture of about stoichiometrical equivalent amounts of dicyclopentadiene dicarboxylic acid and maleic anhydride, 15 to 60 equivalent percent, based on the total equivalents of acid, of an unsaturated aliphatic monocarboxylic acid and a $C_3$ to $C_8$ glycol containing two adjacent hydroxyl radicals, the amount of said total equivalents of acids being no greater than the equivalents of glycol reacted therewith, withdrawing the resulting azeotrope of the water of reaction and the aromatic hydrocarbon diluent, and recovering the remaining resin.

16. A process according to claim 15 wherein said glycol is propylene glycol.

17. A resinous composition which comprises the esterification product of a first reactant consisting of a mixture of an adduct of dicyclopentadiene dicarboxylic acid and maleic anhydride with 25 to 50 equivalent percent, based on the total acid, of an unsaturated aliphatic monocarboxylic acid and, a second reactant consisting of propylene glycol the acid equivalents of said first reactant and the base equivalents of said second reactant being reacted in about equal amounts.

18. A process for producing an improved alkyd resin which comprises reacting dicyclopentadiene dicarboxylic acid at a temperature between about 100° and 300° C. with about a stoichiometrical equivalent amount of maleic anhydride in the presence of a hydrocarbon solvent boiling at a temperature between about 100° and 300° C., partially esterifying, at a temperature between about 50° and 300° C. and in the presence of an aromatic hydrocarbon diluent, the tricarboxylic adduct formed with a $C_3$–$C_8$ glycol containing two adjacent hydroxyl radicals, adding to the reaction mixture 25 to 50 equivalent percent, based on the total acid, of a $C_{12}$–$C_{18}$ unsaturated aliphatic monocarboxylic acid, the amount of equivalents of said total acid and the amount of equivalents of said glycol being about equal, completing esterification at a temperature between about 100° and 350° C., withdrawing the resulting azeotrope of the water of reaction and the aromatic hydrocarbon diluent, and recovering the remaining improved alkyd resin.

References Cited in the file of this patent

UNITED STATES PATENTS

| | | |
|---|---|---|
| 2,397,240 | Butler | Mar. 26, 1946 |
| 2,716,662 | Cohen et al. | Aug. 30, 1955 |